United States Patent Office 3,123,521
Patented Mar. 3, 1964

3,123,521
STABILIZED CHLORINE DIOXIDE
John F. Wentworth, Cranston, and John R. F. Hefler, Jamestown, R.I., assignors to Chemical Research Laboratories of America, Inc., Lafayette, R.I., a corporation of Rhode Island
No Drawing. Filed Aug. 1, 1961, Ser. No. 128,365
5 Claims. (Cl. 167—17)

This invention relates to an antiseptic composition, and, more particularly, to a composition which is antiseptic and non-toxic.

It is well known that chlorine dioxide is a strong oxidizing agent. In aqueous solution, chlorine dioxide has chemical and physical characteristics which make its use as an industrial germicide impractical. It has an irritating, sharp odor evident in concentrations as low as fourteen to seventeen parts per million of gaseous chlorine dioxide. It is extremely corrosive and decomposes rapidly, so that fresh solutions must be made up frequently. The maximum concentration of chlorine dioxide which can be dissolved in water is approximately 2.9 grams per liter, or 2900 parts per million.

Attempts have been made to stabilize aqueous solutions of chlorine dioxide by the addition of stabilizing agents which modify its characteristics sufficiently to permit its use in industrial applications. Patent No. 2,701,781, for example, discloses the stabilization of chlorine dioxide solutions by sodium perborate. An aqueous solution containing a boron compound absorbs more chlorine dioxide and is more stable. Stabilized solutions of chlorine dioxide may contain more than 40,000 parts per million of chlorine dioxide and there is only a small amount of decomposition during storage. The stabilized solutions have only a slight odor of ozone. Concentrated solutions of stabilized chlorine dioxide are corrosive to steel. Dilute solutions, as are normally used industrially, however, are not corrosive to steel, copper, bronze, or other metals.

Since chlorine dioxide has an extremely high germicidal strength, it is particularly effective in the control of microorganisms in food products, paper wrappings for foods and for swimming pools. Perborate stabilized chlorine dioxide solutions cannot be used in these situations, however, because boron compounds tend to accumulate in the digestive system of humans and, over long periods of time, harmful effects may result.

Accordingly, it is an object of this invention to provide an antiseptic and germicidal solution containing chlorine dioxide.

Another object of this invention is to provide a solution of stabilized chlorine dioxide which is non-toxic when taken internally by humans.

It is a further object of this invention to provide an antiseptic solution which has a high germicidal strength and is stable.

According to a preferred embodiment of the invention, chlorine dioxide gas is stabilized by being dissolved in a solution of sodium carbonate peroxide.

The stabilizing compound, sodium carbonate peroxide, is an addition compound of sodium carbonate and hydrogen peroxide, approximately corresponding to the formula $2Na_2CO_3 \cdot 3H_2O_2$. The compound, which can be obtained commercially from Becco Chemical Division, Food Machinery and Chemical Corporation, is a white powder containing fourteen percent active oxygen and twenty-nine percent hydrogen peroxide. Its solubility in water at 20° C. is 13.3%. In powdered form, the compound is relatively stable. Solutions of sodium carbonate peroxide in water have characteristics similar to a solution prepared by separately dissolving hydrogen peroxide and sodium carbonate in water. The former solution, however, is substantially more stable and the loss of original active oxygen content during storage of the solution is less. This suggests that the two solutions are not equivalent.

Chlorine dioxide gas which is to be used in the stabilized solution must be purified to remove all traces of free chlorine. There are several well known techniques for accomplishing this separation. Chlorine gas is objectionable since, in aqueous solution, chlorine forms hypochlorous acid. It has a very sharp odor at concentrations as low as 3½ parts per million. It is also extremely corrosive.

A preferred method for making stabilized chlorine dioxide in accordance with this invention is as follows:

Powdered sodium carbonate peroxide is dissolved in water to form a 12% solution. Chlorine dioxide gas is then bubbled through the solution of sodium carbonate peroxide. Approximately 568 milligrams of gaseous chlorine dioxide will be taken up per gram dry weight of sodium carbonate peroxide. A stabilized chlorine dioxide solution prepared in accordance with this method will contain more than 60,000 p.p.m. of chlorine dioxide at a pH value between six and eight. Similarly effective solutions of chlorine dioxide containing more than 40,000 p.p.m. $ClO_2$ can be prepared by absorbing chlorine dioxide gas in aqueous solutions containing from about 8 to 12% of sodium carbonate peroxide.

The stability of the solution is partially dependent on the acidity of the solution. At a low pH value, below six, free chlorine dioxide is produced due to a reduction in its solubility. The carbonate peroxide compound provides an effective control of the acidity of the solution. The reaction between chlorine dioxide gas and the carbonate peroxygen salt tends to release carbonic acid. This acid is extremely weak and converts to gas at room temperature so that it is lost from solution. Thus, there is a tendency for the pH value of the solution to rise slightly over a long period of time, thereby maintaining the stability of the solution and giving it a long shelf life. For example, a stabilized solution containing 63,125 p.p.m. of chlorine dioxide having a pH of 6.2 was prepared. Three and one-half months later the solution was analyzed for chlorine dioxide. It contained 62,500 p.p.m., a loss of only one percent of its original strength. Its pH value had risen to 8.6 due to the release of carbonic acid from solution.

An antiseptic or germicidal solution may be prepared by diluting the concentrated solution of stabilized chlorine dioxide in the ratio of 1:240,000 with water. This diluted solution can be used safely to control the growth of microorganisms in food products, in food wrappings and in swimming pool water. As a measure of its antiseptic properties, a dilute solution as prepared above has a phenol coefficient of more than three times that of a 3% iodine tincture. However, an antiseptic solution of this dilution is non-toxic. The following is a summary of tests which were conducted to determine the toxicity of the improved stabilized chlorine dioxide solutions of this invention, referred to as "dioxide":

Acute, subacute and chronic toxicity tests in mice by oral feeding were performed with dioxide in several dilutions. Irritation and sensitization tests were performed on guinea pigs.

A. Undiluted dioxide was toxic to mice when fed 0.5 ml. directly by stomach trocar.

B. Dilutions ranging from 1:10 to 1:240 were found to be non-toxic when fed by stomach trocar.

C. Chronic feeding tests by trocar and in drinking water of dioxide dilution 10,000 and 1,000 times more concentrated than the dioxide solution used in manufacture of paper was non-toxic. During a continuous 90 day period mice were given dioxide solution in the drinking water, ad libitum, freshly prepared daily as follows: the first 51 days 1:24,000 dioxide and the last 39 days, 1:2,400 dioxide. No untoward effects were noted.

D. Direct application of 1:240 dilution (1000 times more concentrated than that suggested above for antiseptic purposes) to open surgical wounds in mice was non-toxic and did not affect the healing rate of such wounds.

E. Eye installation of a 1:240 dilution of dioxide was non-irritating in guinea pigs.

F. Topical application of a 1:240 dilution of dioxide to the scarified skin was not sensitizing to a 21 day later challenge dose in guinea pigs.

Conclusion: Dioxide is non-toxic in the concentrations used for paper pulp processing and is non-toxic in concentrations up to 20,000 times that used in manufacture providing an ample margin of safety. Only the undiluted dioxide was found toxic when fed by stomach trocar to mice.

The chlorine dioxide solution stabilized with sodium carbonate peroxide, in addition to being non-toxic, has several important advantages over borate stabilized chlorine dioxide solutions. Sodium carbonate peroxide has the ability to absorb substantially more chlorine dioxide per gram of stabilizing material than does the borate compound. The carbonate stabilized solutions are also more stable and have a longer shelf life than the borate stabilized solutions. The perborate solutions lose up to 20% more of initial strength within ninety days, than do the carbonate stabilized solutions. Sodium carbonate peroxide is more soluble in water than is sodium perborate and eight to twelve percent solutions of the former can be prepared as easily as two to three percent solutions of the latter. The perborate solutions frequently crystallize and require filtering unless high temperatures, which are destructive to hydrogen peroxide stability, are maintained.

The use of certain dilute stabilized chlorine dioxide solutions or chlorite solutions in preventing the growth of microorganisms in water is disclosed and claimed in our earlier copending and commonly owned patent application Serial No. 791,041, filed February 4, 1959, now U.S. Patent No. 3,082,146.

While the invention has been described in one embodiment, it is recognized that variations and changes may be made therein, without departing from the invention as set forth in the claims.

We claim:

1. A composition of matter consisting essentially of an aqueous solution of sodium carbonate peroxide having chlorine dioxide gas dissolved therein.

2. An aqueous solution according to claim 1 comprising more than 60,000 p.p.m. of dissolved chlorine dioxide.

3. As a germicidal concentrate, an aqueous solution consisting essentially of about 8 to 12% of dissolved sodium carbonate peroxide and more than 40,000 p.p.m. of dissolved chlorine dioxide which contains substantially no free chlorine, said solution being maintained at a pH between about 6 and 8.

4. A process for preparing a stabilized solution of chlorine dioxide which consists essentially in dissolving sodium carbonate peroxide in water to form an aqueous sodium carbonate peroxide solution, purifying chlorine dioxide gas to remove free chlorine therefrom, and bubbling the resulting purified chlorine dioxide gas through said aqueous solution.

5. A process for preparing a stabilized solution of chlorine dioxide which consists essentially in dissolving sodium carbonate peroxide in water to form an aqueous solution containing about 8 to 12% of said sodium carbonate peroxide, bubbling chlorine dioxide gas substantially free of chlorine through said aqueous solution until more than about 60,000 p.p.m. of chlorine dioxide is absorbed therein, and maintaining the resulting solution at a pH value between six and eight.

References Cited in the file of this patent

UNITED STATES PATENTS

| | | |
|---|---|---|
| 2,358,866 | MacMahon | Sept. 26, 1944 |
| 2,379,335 | Baker | June 26, 1945 |
| 2,526,839 | Aston | Oct. 24, 1950 |
| 2,701,781 | De Guevara | Feb. 8, 1955 |